United States Patent
Eaton et al.

(10) Patent No.: US 6,555,929 B1
(45) Date of Patent: Apr. 29, 2003

(54) METHOD AND APPARATUS FOR PREVENTING EXCESSIVE REACTION TO A LOAD DISTURBANCE BY A GENERATOR SET

(75) Inventors: Zane C. Eaton, Plymouth, WI (US); Michael S. Lindgren, Sheboygan, WI (US); Eric Albsmeier, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/695,168

(22) Filed: Oct. 24, 2000

(51) Int. Cl.[7] .......................... B60L 11/02; B61C 9/38; F02N 11/04; H02P 11/00; H02P 19/00
(52) U.S. Cl. ................. 290/40 B; 290/40 F; 290/40 R; 290/31; 290/24; 322/17; 322/44; 322/89
(58) Field of Search ..................... 322/28, 17, 90, 322/44, 89, 29; 318/139; 60/668; 180/65.4

(56) References Cited

U.S. PATENT DOCUMENTS

| | | |
|---|---|---|
| 3,654,484 A | 4/1972 | Jorgenson et al. |
| 3,715,652 A | 2/1973 | Elliston |
| 4,128,771 A | 12/1978 | Domenico |
| 4,208,693 A | 6/1980 | Dickens et al. |
| 4,219,860 A | 8/1980 | DePuy |
| 4,245,182 A | 1/1981 | Aotsu et al. |
| 4,280,060 A | 7/1981 | Kure-Jensen et al. |
| 4,322,630 A | 3/1982 | Mezera et al. |
| 4,326,159 A | 4/1982 | Aotsu et al. |
| 4,330,743 A | 5/1982 | Glennon |
| 4,345,288 A | 8/1982 | Kampf et al. |
| 4,346,337 A | 8/1982 | Watrous |
| 4,368,520 A | 1/1983 | Hwang et al. |
| 4,403,292 A | 9/1983 | Ejzak et al. |
| 4,403,293 A | 9/1983 | Bradt et al. |
| 4,438,385 A | 3/1984 | Sato et al. |

(List continued on next page.)

FOREIGN PATENT DOCUMENTS

| | | |
|---|---|---|
| GB | 2 055 262 A | 7/1980 |
| JP | 60-16195 | 1/1985 |

OTHER PUBLICATIONS

Protective Relaying Principles and Applications, 2d ed., J. Lewis Blackburn, pp. 248–249, 312–315, and 370–371, 1998.
BE 1–50/51B Time Overcurrent relay, Basler Electric, 5 pages, 6–92 and 7–96.
Generator Protection, Ch. 11, ANSI/IEEE Std 242–1986, pp. 441–451 and 470–471.
Kohler Power Systems literature: form G12–197, Jun. 1996; form G6–34, Feb. 1997; form G11–63, Oct. 1995; form G11–56, Jun. 1994; form G6–35, Mar. 1998; and form TIB–102, Nov. 1997.

(List continued on next page.)

Primary Examiner—Nestor Ramirez
Assistant Examiner—Julio C. Gonzalez
(74) Attorney, Agent, or Firm—Quarles & Brady LLP

(57) ABSTRACT

A method and apparatus are disclosed for controlling a genset having an engine and an alternator in order to prevent an excessive change in a speed of the engine because of a sudden change in a load on the alternator. The method includes obtaining a first measured value of an actual AC output power of the alternator at a genset controller during a first time period, and obtaining a second measured value of the actual AC output power of the alternator at the genset controller during a second time period. The method further includes determining at the genset controller a first output power based upon at least the first measured value, and a second output power based upon at least the second measured value. The method additionally includes determining at the genset controller, based upon the first output power and the second output power, whether the actual AC output power has changed in an amount greater than a first threshold, and providing a first control signal from the genset controller to the genset causing a position of a throttle to be modified when it is determined that the actual AC output power has changed in an amount greater than the first threshold.

20 Claims, 4 Drawing Sheets

U.S. PATENT DOCUMENTS

| | | |
|---|---|---|
| 4,438,498 A | 3/1984 | Sekel et al. |
| 4,443,828 A | 4/1984 | Legrand et al. |
| 4,477,765 A | 10/1984 | Glennon et al. |
| 4,481,459 A | 11/1984 | Mehl et al. |
| 4,486,801 A | 12/1984 | Jackovich et al. |
| 4,498,016 A | 2/1985 | Earleson et al. |
| 4,527,071 A | 7/1985 | Ausiello |
| 4,533,863 A | 8/1985 | Luhn et al. |
| 4,538,231 A | 8/1985 | Abe et al. |
| 4,550,379 A | 10/1985 | Kawai et al. |
| 4,559,487 A | 12/1985 | Sims et al. |
| 4,583,036 A | 4/1986 | Morishita et al. |
| 4,589,052 A | 5/1986 | Dougherty |
| 4,593,348 A | 6/1986 | Tewesmeier |
| 4,598,373 A | 7/1986 | Morishita et al. |
| 4,602,341 A | 7/1986 | Gordon et al. |
| 4,617,626 A | 10/1986 | Morishita et al. |
| 4,651,081 A | 3/1987 | Nishimura et al. |
| 4,659,977 A | 4/1987 | Kissel et al. |
| 4,670,704 A | 6/1987 | Maehara et al. |
| 4,672,501 A | 6/1987 | Bilac et al. |
| 4,682,097 A | 7/1987 | Matsui |
| 4,699,025 A * | 10/1987 | Omitsu ..................... 477/43 |
| 4,701,690 A | 10/1987 | Fernandez et al. |
| 4,714,869 A | 12/1987 | Onitsuka |
| 4,731,547 A | 3/1988 | Alenduff et al. |
| 4,777,425 A | 10/1988 | MacFarlane |
| 4,800,291 A | 1/1989 | Bowers |
| 4,839,575 A | 6/1989 | MacFarlane |
| 4,855,664 A | 8/1989 | Lane |
| 4,912,382 A * | 3/1990 | Koening et al. ............ 318/563 |
| 4,937,561 A | 6/1990 | Sasaki et al. |
| 4,996,646 A | 2/1991 | Farrington |
| 5,006,781 A * | 4/1991 | Schultz et al. ................ 322/25 |
| 5,057,962 A | 10/1991 | Alley et al. |
| 5,117,174 A | 5/1992 | Kessler |
| 5,168,208 A | 12/1992 | Schultz et al. |
| 5,206,776 A | 4/1993 | Bodenheimer et al. |
| 5,216,350 A | 6/1993 | Judge et al. |
| 5,294,879 A | 3/1994 | Freeman et al. |
| 5,298,842 A | 3/1994 | Vanek et al. |
| 5,303,160 A | 4/1994 | Winter et al. |
| 5,305,234 A | 4/1994 | Markus et al. |
| 5,309,312 A | 5/1994 | Wilkerson et al. |
| 5,376,877 A | 12/1994 | Kern et al. |
| 5,390,068 A * | 2/1995 | Schultz et al ................ 361/95 |
| 5,418,675 A | 5/1995 | Bodenheimer et al. |
| 5,450,268 A | 9/1995 | Philips et al. |
| 5,451,876 A | 9/1995 | Sandford et al. |
| 5,477,827 A | 12/1995 | Weisman, II et al. |
| 5,483,927 A | 1/1996 | Letang et al. |
| 5,486,751 A | 1/1996 | Koenig |
| 5,504,417 A | 4/1996 | Kern et al. |
| 5,615,654 A | 4/1997 | Weisman, II et al. |
| 5,629,568 A * | 5/1997 | Mertens .................... 290/40 R |
| 5,640,060 A | 6/1997 | Dickson |
| 5,701,070 A | 12/1997 | Schultz |
| 5,732,676 A | 3/1998 | Weisman et al. |
| 5,751,532 A | 5/1998 | Kanuchok et al. |
| 5,754,033 A | 5/1998 | Thomson |
| 5,761,073 A | 6/1998 | Dickson |
| 5,847,644 A | 12/1998 | Weisman, II et al. |
| 5,886,504 A | 3/1999 | Scott et al. |
| 5,938,716 A | 8/1999 | Shutty et al. |
| 5,978,729 A | 11/1999 | Landes et al. |
| 5,999,876 A | 12/1999 | Irons et al. |
| 6,018,200 A | 1/2000 | Anderson et al. |
| 6,351,692 B1 * | 2/2000 | Eaton et al. ................... 322/10 |
| 6,158,416 A * | 12/2000 | Chen et al. ................. 123/380 |
| 6,175,217 B1 * | 1/2001 | Da Ponte et al. ............. 322/19 |

OTHER PUBLICATIONS

System Coordination With Fast–Response Generators, Gordon S. Johnson, Kohler Co., Generator Division, 1983.

A Working Manual on Molded Case Circuit Breakers, $4^{th}$ ed., Westinghouse, pp. 162, 16 and 41–43, Mar. 1993.

Literature concerning Automatic Engine Controllers by DynaGen Systems, Inc., found at http://dynagensystems.com, printed Mar. 1, 2000.

Literature concerning Diesel and Gas Generator Set, found at http://www2.savoiapower.com, printed Mar. 2, 2000.

Literature concerning alternators, found at http://www.wai–wetherill.com, printed Mar. 2, 2000.

Literature concerning electric motors, found at http://www-.friesen.com, printed Mar. 2, 2000.

Regulation en temps réel d'une génératice asynchrone, Electronique Industrielle, pp. 70–73, avril, No. 86, Paris, France, 1985.

Digital Controller Design Method For Synchronous Generator Excitation and Stabilizer Systems; Part II: Hardware/Software Design and Implementation Results, IEEE Transactions on Power Systems, pp. 638–644, vol. PWRS–2, No. 3, Aug. 1987.

EE Handbook, 11th Edition, Fink & Beaty, pp. 18–27 through 18–39.

* cited by examiner

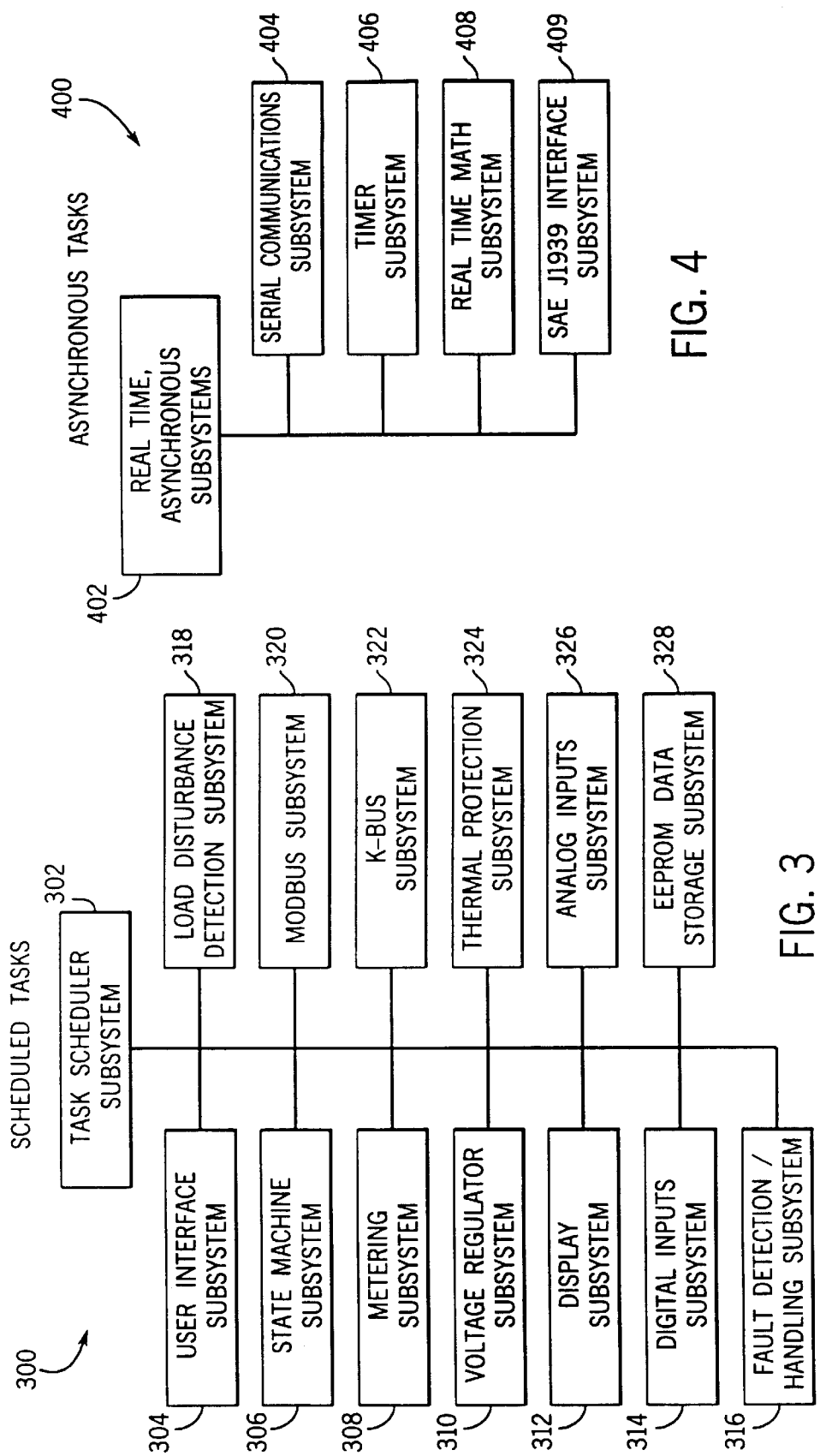

METHOD AND APPARATUS FOR PREVENTING EXCESSIVE REACTION TO A LOAD DISTURBANCE BY A GENERATOR SET

FIELD OF THE INVENTION

The present invention relates to the control of an electric generator set including an engine and an alternator. In particular, the present invention relates to the control of an electric generator set that has a variable load at the output of the alternator.

BACKGROUND OF THE INVENTION

Electric generator sets (or "gensets") are widely used to provide electric power. A genset typically includes an engine coupled to an alternator, which converts the rotational energy from the engine into electrical energy. The terminal voltage of a genset is proportional to both the magnetic flux density within the alternator, and the speed of the engine. The magnetic flux density is typically determined by controlling an armature voltage or field current on the alternator, while the speed of the engine is typically determined by an engine governor.

When a load is attached to the output terminals of the alternator or when an attached load increases in size, the speed of the engine tends to drop unless the engine governor appropriately adjusts the position of the throttle of the engine. In practice, the adding or increasing of a load does not adversely affect the performance of a genset if the load is only added gradually to the alternator or if the load is very small, since the engine governor is capable of effectively responding to the increased load. However, if a load is too quickly added to the alternator, particularly if the load is large, an excessive drop in the speed of the engine can occur. The engine governor is unable to open the throttle fast enough to maintain the engine's speed. Because the speed of the engine drops excessively, the output voltage and frequency of the alternator also drop excessively.

Although it would be desirable if an engine governor was capable of opening a throttle at a faster rate in order to maintain an engine's speed, mechanical time constraints inherent in conventional engine systems limit the rate at which a throttle can be opened.

Further, while certain prior art systems exist that maintain engine speed despite sudden increases in the load on the alternator, none of these prior art systems both (a) maintains the voltage output level of the alternator at the desired level and (b) applies to gensets in which the AC power output of the alternator is directly supplied to outside power lines or other loads without rectification or inversion. That is, certain prior art systems exist which maintain engine speed approximately constant by momentarily relaxing the armature voltage or field current when the load on the alternator suddenly increases. By relaxing the armature voltage or field current, the effective load on the engine is decreased, and consequently the speed of the engine does not decrease as much as it otherwise would. While an excessive drop in the engine speed is prevented by these systems, the output voltage of the alternator cannot remain at the desired level but rather must decrease because of the decrease in the armature voltage or field current.

Other prior art systems exist that prevent an excessive drop in the engine speed of a genset by causing the throttle of the engine to open rather than by relaxing the armature voltage or field current of the alternator. However, these prior art systems determine whether it is necessary to open the throttle of the engine by measuring DC power output of the genset. That is, these prior art systems apply only to gensets in which the AC power output from the alternators is rectified into DC power. Such gensets include rectifiers to convert the AC power into DC power, and must further include inverters to reconvert the DC power into AC power suitable for output to power lines and other AC loads. Thus, these prior art systems are not applicable to gensets in which the AC power output of the alternators is to be directly connected to power lines and other AC loads.

It would therefore be advantageous if a method and apparatus were developed for preventing or minimizing the decreases in the engine speed of a genset that occur when there are sudden load increases at the output of the alternator of the genset. It would additionally be advantageous if the operation of the method and apparatus did not negatively affect the output voltage and frequency of the alternator, and if the method and apparatus were applicable to gensets that were designed to directly supply AC power output from the alternators to power lines or other AC loads, without any intermediate rectification or inversion.

SUMMARY OF THE INVENTION

The present inventors have discovered that it is possible to counteract the tendency of the engine of a genset to slow down in response to an increased load on the alternator of the genset by causing the throttle to open up sooner than it otherwise would if only the engine governor were being utilized to control the throttle. The present inventors have further discovered that it is possible to determine when such action to open the throttle should be taken solely based upon information concerning the AC power output of the alternator of the genset, without rectification.

The present invention relates to a method of controlling a genset having an engine and an alternator in order to prevent an excessive change in a speed of the engine because of a sudden change in a load on the alternator. The method includes obtaining a first measured value of an actual AC output power of the alternator at a genset controller during a first time period, and obtaining a second measured value of the actual AC output power of the alternator at the genset controller during a second time period. The method additionally includes determining at the genset controller a first output power based upon at least the first measured value, and a second output power based upon at least the second measured value. The method further includes determining at the genset controller, based upon the first output power and the second output power, whether the actual AC output power has changed in an amount greater than a first threshold, and providing a first control signal from the genset controller to the genset causing a position of a throttle to be modified when it is determined that the actual AC output power has changed in an amount greater than the first threshold.

The present invention additionally relates to an apparatus for controlling a genset having an engine and an alternator in order to prevent an excessive change in a speed of the engine because of a sudden change in a load on the alternator. The apparatus includes a first input terminal configured to receive at least a first measured value and a second measured value of an actual AC output power of an alternator of the genset, and a processor coupled to the first input terminal. The processor is configured to determine a first output power and a second output power based upon at least the first measured value and at least the second measured value, respectively, and to determine, based upon the first output power and the second output power, whether the actual AC output power has changed in an amount greater than a first threshold. The apparatus further includes a first output terminal that is coupled to the processor and configured to provide a first output signal to the genset causing a position of a throttle on the genset to change when the processor determines that the actual AC output power of the alternator has changed in an amount greater than the first threshold.

The present invention additionally relates to an apparatus for converting mechanical energy into electrical energy. The apparatus includes a genset including an engine coupled to an alternator, and an engine control module coupled to the genset. The apparatus further includes a means for monitoring an actual AC output power of the alternator, for determining whether the actual AC output power has increased in an amount greater than a first threshold, and for providing a first signal to the engine control module in order to cause an opening of a throttle of the engine when it is determined that the actual AC output power has increased in an amount greater than the first threshold.

BRIEF DESCRIPTION OF THE DRAWINGS

FIG. 3 is a detailed block diagram of software tasks that are performable by the apparatus of FIG. 1;

FIG. 4 is a detailed block diagram of additional software tasks that are performable by the apparatus of FIG. 1.

DETAILED DESCRIPTION OF THE PREFERRED EMBODIMENT

Figure 1:
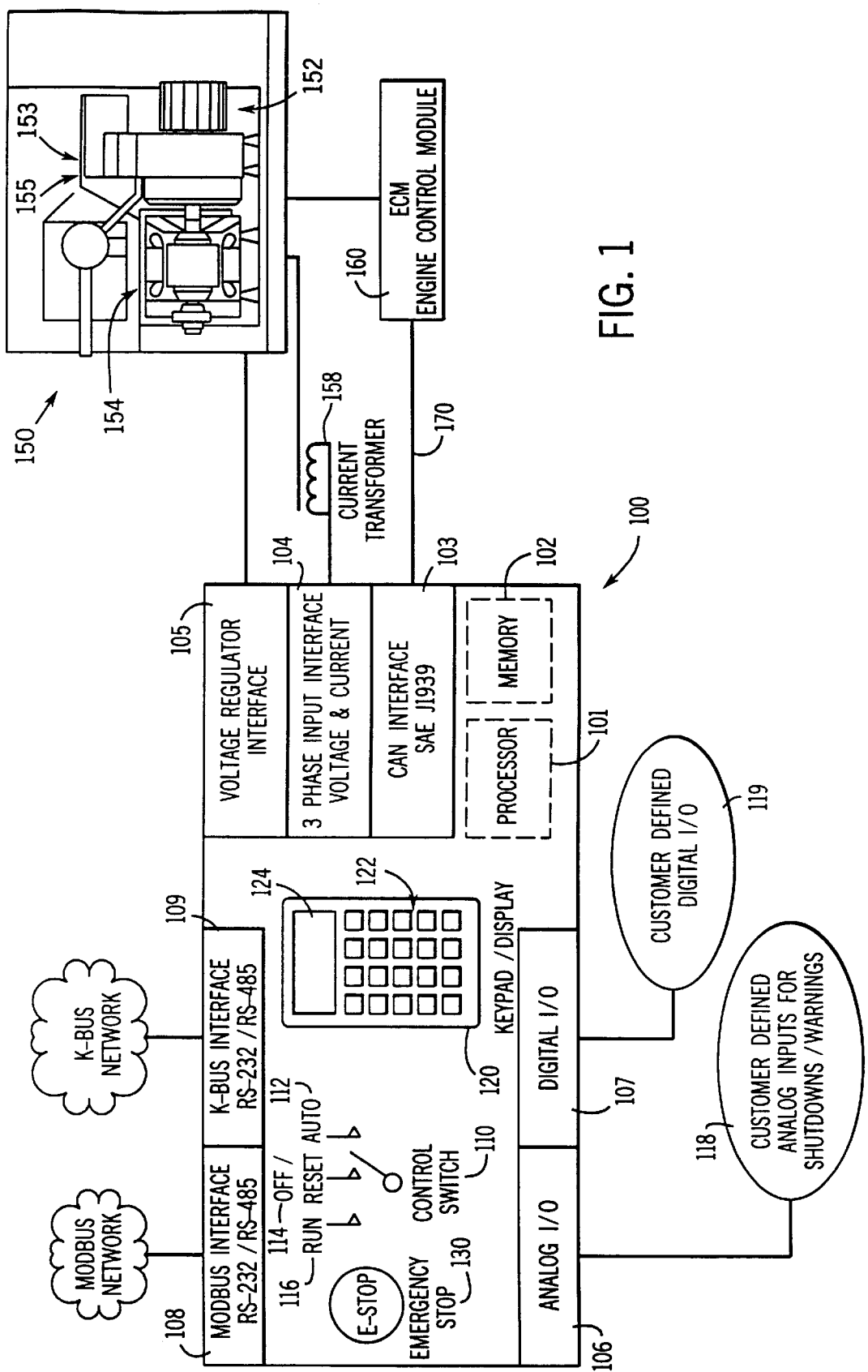
FIG. 1 is a block diagram showing a genset, an engine control module, and an exemplary apparatus that is capable of performing the method of the present invention.

Referring to FIG. 1, a generator set controller (or genset controller) 100 is shown coupled to a generator set (genset) 150. Genset controller 100 can be located remotely from genset 150 (up to 40 feet) or attached to the genset directly by way of an engine harness. Genset 150 includes an engine 152 and an alternator (or synchronous generator) 154, and has a typical power rating of between 20 KW and 2000 KW or more. Engine 152 is typically an internal combustion engine that is powered by gasoline, diesel fuel, methane gas or other fuels, for example, the Series 60, Series 2000 or Series 4000 engines manufactured by Detroit Diesel Company of Detroit, Mich. Engine 152 rotates a rotor (not shown)of alternator 154, which outputs electrical power. Alternator 154 is typically a three-phase machine, such as the Model 5M4027 alternator manufactured by Marathon Electric Company. Engine 152 includes an engine governor 153, which controls a throttle 155 of the engine and thereby controls the speed of the engine.

Figure 2:
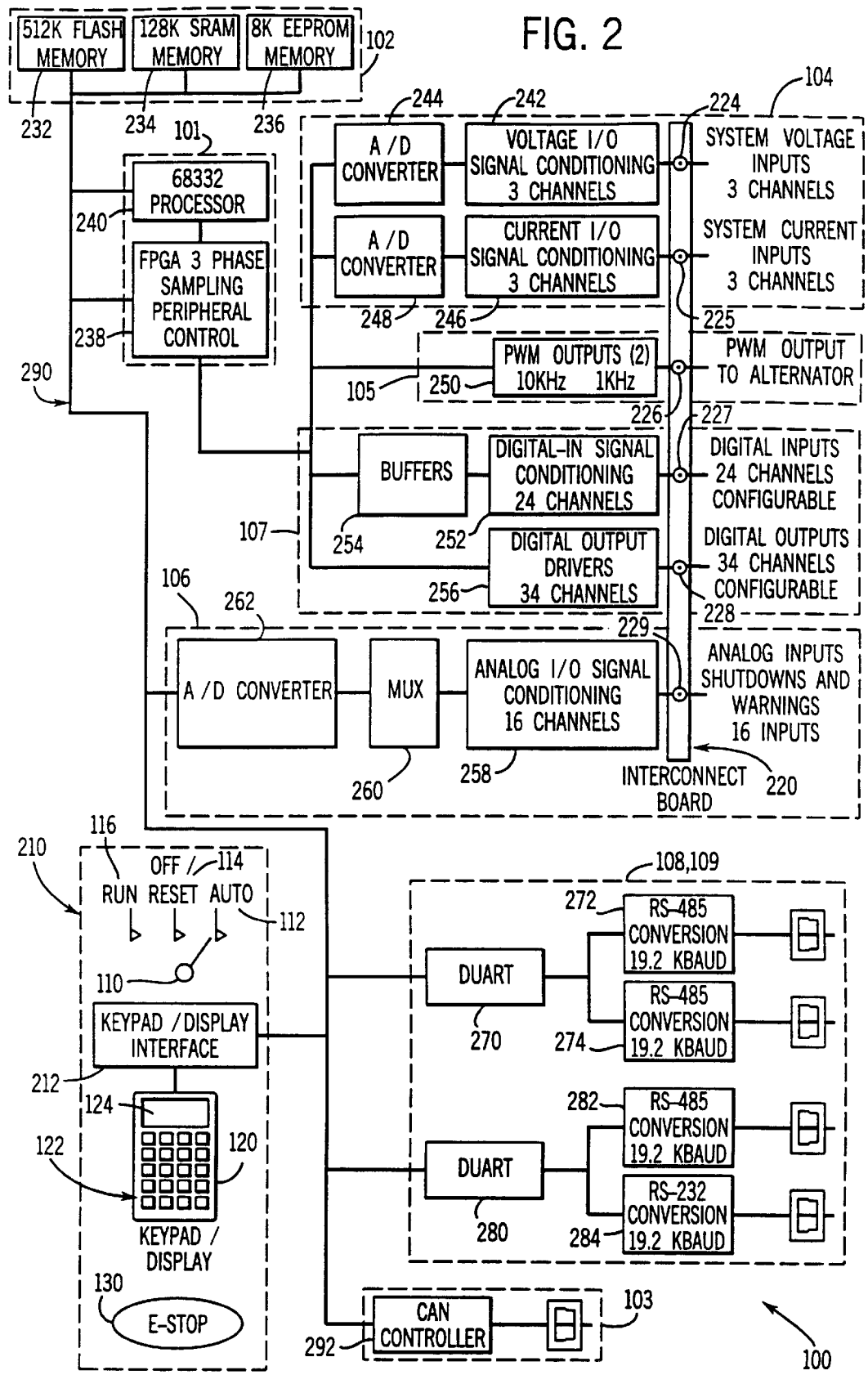
FIG. 2 is a detailed block diagram of the apparatus of FIG. 1.

Genset controller 100 operates to control and monitor the operation of genset 150. As shown in FIGS. 1 and 2, genset controller 100 is a microprocessor-based (or otherwise computer-driven) system having a processor 101 and a memory 102. Referring to FIG. 2, memory 102 includes a 512K FLASH memory 232, a 128K SRAM memory 234, and an 8K EEPROM memory 236. Processor 101 includes a microcontroller or microprocessor 240 (e.g., a MC68332 processor manufactured by Motorola, Inc. of Schaumburg, Ill.), and also a field-programmable gate array (FPGA) 238. FPGA 238 allows for memory allocation among memories 232–236. Processor 101 and memory 102 are coupled to one another and other elements of the genset controller 100 by an internal bus structure 290.

Genset controller 100 employs several interfaces to provide control and monitoring of genset 150, including a CAN interface 103, a three-phase input interface 104, a voltage regulator interface 105, an analog input/output interface (analog I/O) 106 and a digital input/output interface (digital I/O) 107. Three-phase input interface 104, voltage regulator interface 105 and digital I/O 107 each are coupled directly to FPGA 238 of processor 101, which allows for signal sampling, signal multiplexing, and control of peripheral devices (such as operator interface devices, discussed below). CAN interface 103 and analog I/O 106 are coupled to processor 101 by way of internal bus 290. Input and output ports for each of interfaces 104–107 are provided on an interconnect board 220 of genset controller 100.

The processor 240 operates under the direction of stored program instructions to read in information through the three-phase input interface 104 regarding the operation of the alternator 154 in the genset 150. Referring to FIGS. 1 and 2, the three-phase alternator output voltages are applied to system voltage inputs 224, and the three-phase alternator output currents are coupled through a current transformer 158 to system current inputs 225. These six analog input signals are filtered by respective voltage and current conditioning circuits 242 and 246 and are digitized by respective voltage and current analog-to-digital converters 244 and 248. These digitized indications of alternator output voltages and currents are read by the processor 240 and used to monitor genset performance. This information may be displayed and it may be used to calculate other genset operating parameters, such as output power, reactive power, power factor and alternator duty level and frequency.

The digitized alternator output signals are also used as the basis for controlling the operation of the alternator 154. As will be described below, the processor 101 is programmed to provide command signals to the voltage regulator interface 105. These commands operate a pulse width modulation (PWM) unit 250 which outputs pulse-width modulated signals to PWM output 226 of interconnect board 220. These PWM signals are applied to alternator 154 to control the voltage, current, and power output levels of the alternator. In particular, voltage regulator interface 105 provides an approximately 10 KHz PWM signal to adjust the field current on alternator 154 to control the armature voltage and maintain the output voltage at a particular level. The voltage regulator interface 105 may also provide a 1 KHz PWM signal for governing engine speed 152, if an ECM is not employed.

In addition to providing control and monitoring of alternator 154, genset controller 100 also provides control and monitoring of engine 152. Although in certain embodiments genset controller 100 directly controls engine 152, in the preferred embodiment genset controller 100 does not directly control the engine. Rather, the operation of engine 152 is directly controlled by an engine control module (ECM) 160, which typically is physically attached to the engine. ECM 160 can control engine speed (and other engine operating parameters), and thereby control the output power of alternator 154. ECM 160 also monitors a variety of engine characteristics, for example, fuel consumption, oil pressure, emissions levels, coolant temperature, time delay engine cool down information, and time delay engine start information.

The genset controller 100 controls and monitors the ECM 160 through CAN interface 103 which connects to the CAN serial link 170. CAN serial link 170, employs the SAE J1939 protocol which is an industry standard protocol for serial communications. By way of CAN databus 170, genset controller 100 receives the information about the operation of engine 152 that has been collected by ECM 160, and provides commands to the ECM 160 to influence the operation of the engine. In particular, genset controller 100 receives information concerning the speed of engine 152, and also can provide commands to open or close the throttle 155 of the engine, which commands supplement or entirely override the operation of the engine governor 153. Further, upon determining the occurrence of system faults, genset controller 100 provides commands to engine 152 via ECM 160 causing the engine to shutdown, by turning off both the ignition and the cranking of the engine.

The genset controller 100 includes analog I/O 106 and digital I/O 107 which enable it to communicate with a variety of devices. The analog I/O 106 receives up to sixteen separate analog input signals at inputs 229 on interconnect board 220. These analog signals are filtered by conditioning circuit 258, and applied to an A/D converter 262 through a multiplexer 260. The processor 101 can thus sequentially scan the analog inputs and read in digitized signals indicative of engine parameters such as engine temperature, gas emissions and engine battery charge.

The digital I/O 107 receives 24 single-bit TTL signals at digital inputs 227, and produces 34 single-bit TTL signals at digital outputs 228 on interconnect board 220. Digital inputs 227 are coupled to a digital input signal conditioning unit 252, which conditions the input signals and provides the signals to FPGA 238 via buffers 254. Three of the inputs 227 are dedicated to signals relating to emergency stopping, remote starting, and low coolant level of genset 150. The remaining inputs are definable inputs, which can be enabled or disabled, and are coupled to a variety of discrete sensors. The discrete sensors are capable of indicating various types of engine characteristics, warning conditions, and system faults relating to low fuel, or high oil temperature, as well as switchgear conditions concerning the synchronization of the power output of genset 150 with power lines to which the genset is being connected.

Genset controller 100 is capable of performing a variety of functions in response to the signals received at analog inputs 229 and digital inputs 227. In particular, genset controller 100 is capable of scaling the signals, monitoring genset parameters through the use of the signals, detecting system faults, and providing system warnings or system shutdowns in response to the signals. As will be discussed in more detail below, genset controller 100 is also capable of displaying (in real-time) information obtained from the signals, providing relay driver outputs (RDOs) in response to the signals, and relaying information in the signals to remote control and monitoring stations.

The 34 digital outputs 228 are driven by digital output drivers 256. The digital outputs 228 are controlled by the processor acting through FPGA 238. Three digital outputs are dedicated to a Controller Panel Lamp Relay, a Controller Engine Crank Relay, and a Controller Engine Fuel Relay. The remaining digital outputs are definable, and typically are RDOs that determine the on/off status of a variety of indication/warning lamps within a remote control station. The definitions of these digital outputs typically correspond to particular system warnings, shutdowns or other conditions. For example, the definable digital outputs can be RDOs corresponding to "NFPA-110" functions such as overspeed, overcranking, low oil pressure, or high coolant temperature of engine 152. The definable digital outputs can also be RDOs corresponding to loss of signal functions, including a loss of communications with ECM 160. Additionally, the definable digital outputs can be RDOs corresponding to one of many system fault conditions concerning the genset 150 or the genset controller 100 itself.

As shown in FIGS. 1 and 2, genset controller 100 also includes a number of operator interface devices, by which an operator can both provide commands to the genset controller and receive information from the genset controller. The operator interface devices are included on a front panel Man Machine Interface (MMI) 210, which is situated on a controller box. One of the operator interface devices is an emergency stop button 130.

Emergency stop button 130 allows an operator to immediately stop the genset 150 by pressing a pushbutton.

A second operator interface device is a keypad/display 120, which includes 16 individual keypads 122 and a vacuum flourescent display (VFD) 124. Keypad/display 120 is coupled to a keypad/display interface 212 in front panel MMI 210, which in turn is coupled to internal databus 290. Keypads 122 allow an operator to enter a variety of information and commands to genset controller 100. VFD 124 is an alphanumeric display, and allows genset controller 100 to display various information concerning system operation and system faults to an operator. A VFD is employed because it provides good visibility over a large range of temperatures and from a wide range of viewing angles.

The operator interface devices further include a control switch 110, which can be rotatably set to one of three positions: an Automatic (Auto) position 112; an Off/Reset position 114; and a Run position 116. Setting the control switch to Run position 116 causes genset controller 100 to send a signal via ECM 160 to start and run the genset 150. Setting control switch 110 to Auto position 112 allows the genset 150 to be started and controlled from a remote location. This mode of operation also allows for time-delayed engine starting and cool-down. Setting control switch 110 to Off/Reset position 114 initiates the immediate shutdown of genset 150 and also results in a resetting of the software of genset controller 100. If a fault occurs that precipitates a system shutdown, an operator must move control switch 110 to Off/Reset position 114 to clear the fault before genset 150 can be started again.

Genset controller 100 also includes other devices which provide information to an operator, including several light-emitting diodes (LEDs) and an alarm horn (not shown). These devices are used to provide system status information to an operator, as well as to alert the operator to the existence of system faults. During the occurrence of some faults, a message concerning the fault or related warning/shutdown condition is displayed on VFD 124, an appropriate warning LED on front panel MMI 210 is turned on, the alarm horn is activated, and a corresponding RDO is produced at a digital output 228.

As shown in FIG. 1, genset controller 100 is capable of communication with other remote control and monitoring devices via both a K-BUS interface 109 and a second serial interface 108. K-BUS interface 109 provides serial communications using the proprietary K-BUS serial communications protocol. Second serial interface 108 provides serial communications using any of a variety of other "open" serial communications protocols, including the Modbus™ protocol. Each of K-BUS interface 109 and second serial interface 108 is configurable to use either the RS-232 or RS-485 standards.

In the preferred embodiment shown in FIG. 2, the structures associated with K-BUS interface 109 and second serial interface 108 include a first dual universal asynchronous receiver/transmitter (DUART) 270 that is coupled to two RS-485 conversion units 272 and 274, and a second DUART 280 that is coupled to an RS-485 conversion unit 282 and an RS-232 conversion unit 284. Each of DUARTs 270, 280 is coupled to internal databus 290 and is controlled in response to program instructions executed by microcomputer 240.

The microprocessor 240 operates the genset under the direction of programs illustrated in FIGS. 3 and 4. The programs include scheduled tasks which, as illustrated in FIG. 3, are performed one at a time under the direction of a task scheduler program 302. The programs also include asynchronous tasks as illustrated in FIG. 4. The asynchronous tasks are performed in response to interrupts that are managed by a real time, asynchronous program 402.

Referring to FIGS. 3 and 4, two block diagrams 300, 400 are provided showing software based subsystems (or tasks) that are performed by microprocessor 240 of genset controller 100. Through the operation of these subsystems, microprocessor 240 is capable of monitoring genset 150 (as well as capable of monitoring the operation of genset controller 100), receiving operator commands, detecting system faults, providing system warnings and shutdowns when necessary, displaying information at keypad/interface 120 (and at other operator interface devices), and conducting communications with genset 150, ECM 160 and other devices via K-BUS interface 108 and second serial interface 109. The subsystems of block diagrams 300, 400 are self-contained routines that control specific aspects of genset controller 100. Each subsystem is an independent, modular unit with well-defined input/output protocols to communicate with other subsystems.

Block diagram 300 shows scheduled subsystems, which are scheduled according to a task scheduler subsystem 302. The task scheduler subsystem is capable of invoking any subsystem at a rate of up to 100 times a second, and is able to handle transitions between subsystems and to monitor the execution times of subsystems to make sure that subsystems do not exceed their time allotments. As shown, other scheduled subsystems (which are scheduled by task scheduler subsystem 302) include a user interface subsystem 304, a state machine subsystem 306, a metering subsystem 308, a voltage regulator subsystem 310, a display subsystem 312, a digital inputs subsystem 314, and a fault detection/handling subsystem 316. Further, the scheduled subsystems include a load disturbance detection subsystem 318, a Modbus™ (or other serial communications) subsystem 320, a K-BUS subsystem 322, a thermal protection subsystem 324, an analog inputs subsystem 326, and an EEPROM data storage subsystem 328.

Block diagram 400 shows asynchronous subsystems. As shown in block 402, these subsystems operate in real time, asynchronously, with respect to the scheduled subsystems (i.e., operate in the "background" of the scheduled subsystems). The asynchronous subsystems also provide data when the scheduled subsystems require such data. The asynchronous subsystems are interrupt-driven modules and can take advantage of special features of microprocessor 240 (such as the embedded time processing unit within the microprocessor). The asynchronous subsystems include a serial communications subsystem 404, a timer subsystem 406, a real time math subsystem 408 (which employs a time processing unit of microprocessor 240), and a SAE J1939 interface subsystem 409.

Figure 5:
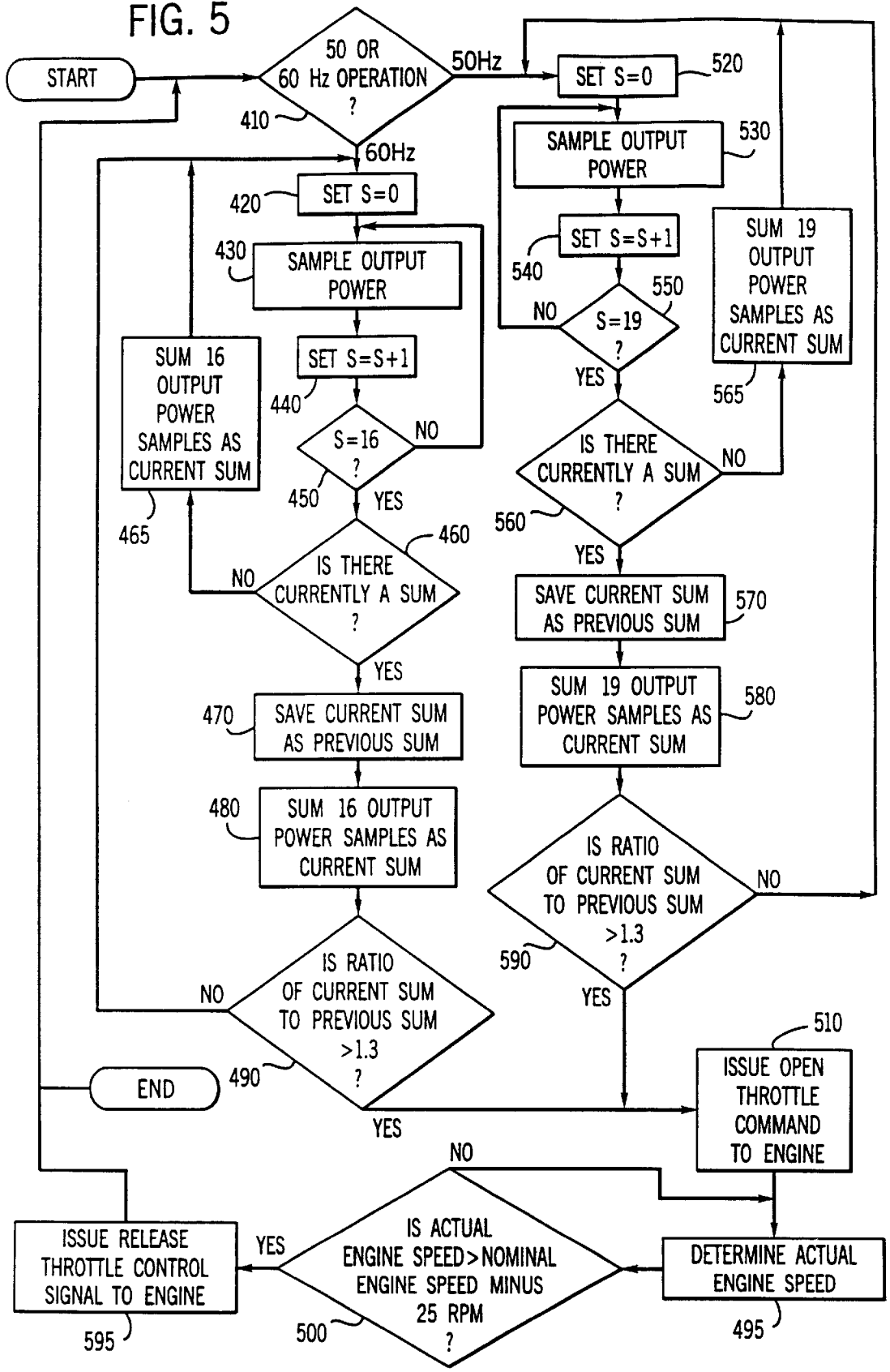
FIG. 5 is a flow chart with exemplary method steps that are performable by the apparatus of FIG. 1 in accordance with one embodiment of the invention.

Turning to FIG. 5, a flowchart is provided showing exemplary method steps that can be performed by the genset controller 100 in accordance with one embodiment of the invention. The performing of the steps of the method prevents an excessive drop in the speed of engine 152 when the load on the alternator 154 increases in a step-wise or otherwise sudden manner. Upon commencement of operation, i.e., the turning on of the genset controller 100, the genset controller determines at step 410 whether the genset 150 is operating at 50 Hz or 60 Hz. This information can be obtained by monitoring the voltages and currents output from the alternator 154 via three phase input interface 104 or, in alternate embodiments, can be obtained from the engine control module 160. The frequency can also be deduced from information concerning the speed of the engine 152, regardless of whether an engine control module 160 is present.

Upon determining that the genset 150 is operating at 60 Hz, the genset controller 100 proceeds to step 420, at which a sample number s is set to 0. Next, at step 430, the genset controller 100 obtains a sample of the AC output power of the alternator 154, by obtaining the three phase voltage and current information at three phase input interface 104. At step 440, the sample number s is incremented. So long as less than 16 samples have been obtained of the AC output power of the alternator 154, the genset controller 100 continues to obtain additional samples due to the operation of step 450. In one embodiment of the invention, samples are obtained every 520.8 microseconds, and all 16 samples are obtained in a time period that is less than 10 milliseconds.

Once 16 samples have been obtained, the genset controller 100 proceeds from step 450 to step 460, in which the genset controller determines whether there already is a sum of samples stored in the memory of the genset controller. If no sum of samples is currently stored, an additional set of samples must be taken in order to determine whether there has been a sudden increase in the load on the alternator 154. Thus, the genset controller 100 proceeds to step 465, in which the 16 recent samples are summed together as a current sum, and then the genset controller returns to step 420 to begin receiving an additional 16 samples.

Once two sets of 16 engine samples have been obtained, the genset controller 100 has sufficient information to determine whether a sudden increase in the load has occurred. After receiving the second set of 16 samples, the genset controller 100 saves the current sum as a previous sum in step 470 and then sums the most recent 16 samples as the new current sum at step 480. The previous sum is representative of the average load during a first time period, and the current sum is representative of the average load during a second, more recent, time period. Taking the averages, or a proxy for the averages, of multiple power samples is typically required so that short spikes in the output power, which are not representative of the actual output power, are ignored by the genset controller 100.

At step 490, the genset controller 100 takes the ratio of the current sum to the previous sum. By taking the ratio of the current sum to the previous sum in step 490, the genset controller 100 effectively compares the average output power of the alternator 154 during the second time period with the average output power during the first time period. If the ratio is greater than 1.3, indicating that the average load on the alternator 154 has increased by over 30% between the first and second time periods, the genset controller 100 proceeds to step 510, in which the genset controller provides a command to open the throttle 155 of the engine 152. The command to open the throttle 155 can be provided from the genset controller 100 via the CAN interface 103 to the engine control module 160. In the present embodiment, the command supplements the operation of the engine governor 153 by commanding that additional torque be provided.

Once a command to open the throttle 155 has been provided to the engine 152, the genset controller 100 then monitors the speed of the engine. At step 495, the genset controller 100 determines an actual engine speed based upon the output of the alternator 154. Next, at step 500, the genset controller 100 determines whether the difference between the actual engine speed and a nominal engine speed is less than 25 RPM. If the difference is greater than 25 RPM, the genset controller 100 presumes that the throttle 155 should be left open longer since the engine speed is still in danger of dropping excessively. However, if the difference is less than 25 RPM, the genset controller 100 presumes that the speed of the engine 152 is no longer in danger of dropping excessively in response to the increased load on the alternator 154. Therefore, the genset controller 100 then proceeds to step 595, in which the genset controller issues a signal to the engine control module 160 to release all throttle control to the engine governor 153. The genset controller 100 then returns to 'step 410, or can end operation.

If it is determined in step 410 that the genset 150 is operating at 50 Hz, the genset controller 100 proceeds through steps 520 through 590 which parallel steps 420 through 490. The operation of the genset controller 100 in steps 520 through 590 is identical to its operation in steps 420 through 490, except insofar as 19 samples of the output power of the alternator 154 are obtained at step 530, rather than 16 samples. This is due to the operation of step 550, at which it is determined whether 19, rather than 16, samples have been obtained. 19 samples therefore are summed at steps 565 and 580.

The flowchart of FIG. 5 can be modified significantly in alternate embodiments of the invention. For example, in certain embodiments where the frequency of operation of the genset 150 is known to be either 50 Hz or 60 Hz, the flowchart does not require step 410 and only requires one of the sets of steps 420 through 490 and 520 through 590, depending on whether the genset 150 is to operate at 60 Hz or 50 Hz, respectively. In other embodiments, the number of samples of the output power of the alternator 154 that are taken in order to determine the output power of the alternator can vary, as can the period of time between successive samples. For example, only two output power samples need be taken. In further alternate embodiments, steps 465 and 480 can be modified to generate average values of the output power of the alternator 154 rather than merely sums. In some of these embodiments, the genset controller 100 at step 490 calculates a difference between the first and second average output powers of the alternator 154, and compares that difference with a threshold.

In the present embodiment of FIG. 5, the commands provided to the engine control module 160 in steps 510 and 595 cause the throttle 155 to open and close completely. However, in alternate embodiments, the commands can vary to cause a greater or lesser amount of opening on the part of the throttle, depending upon the size of the increase in the load on the alternator 154 or the difference between the actual engine speed and the nominal engine speed. In a preferred embodiment of the invention, the genset controller 100 determines if the ratio of the current sum to the previous sum is less than, greater than or within the range of 1.1–1.25. If the ratio is less than 1.1, the genset controller 100 does not take any special action to control throttle 155. However, if the ratio is greater than 1.25, the genset controller 100 provides a command to open the throttle sufficiently to increase the torque by 25%, and if the ratio is between 1.1 and 1.25, the genset controller provides a command to increase the torque by an amount proportional to the increase in power (e.g., if the ratio is 1.2, the genset controller provides a command to increase the torque by 20%).

Further in this preferred embodiment, the initial command to increase the torque is only provided for 100 milliseconds. After 100 milliseconds, the genset controller 100 then provides a new torque command that is proportional to the difference between the actual engine speed and the nominal engine speed. The genset controller 100 continues to provide this new torque command until the difference between the actual and nominal engine speeds is less than 25 RPM. If the difference does not fall below 25 RPM within 3 seconds of the initial torque command, then the genset controller 100 presumes there is a malfunction and provides a new change in the throttle command to produce an additional change in the engine speed (or takes some other action such as commanding a shutdown of a subsystem).

In further alternate embodiments, the genset controller 100 continues to sample the output power of the alternator 154 even after the command has been issued to open the throttle 155. In such embodiments, the open throttle command can be repeatedly sent and/or varied over time so that the degree to which the throttle 155 is opened varies with time based upon continuing changes in the load on the alternator 154. In additional alternate embodiments, the determination by the genset controller 100 concerning whether to issue the command to release control of the throttle 155 to the engine governor 153 depends not upon the difference between the actual engine speed and the nominal engine speed, but rather depends upon the slope of the engine speed. In such embodiments, the slope of the engine speed can be determined by the genset controller 100 based upon repeated measurements of the engine speed as provided from the engine control module 160.

Additional embodiments of the invention can differ from the above-discussed embodiments depending upon the size of the genset 150, the size of the load on the alternator 154, the existence of a very large reactive load on the alternator, the existence of additional gensets in parallel with the genset 150, and the existence of a utility in parallel with the genset 150. The size of the genset 150 can affect the operation of the system since, if the engine 152 is large, the engine may not slow down below the throttle release band (i.e., 100 RPM) by the time the genset controller 100 evaluates the speed of the engine. Further, in certain circumstances alternate embodiments are necessary if it is desired that the system operate when only small loads are applied to the output of the alternator 154 when the alternator has commenced operation from no-load.

In alternate embodiments, the present invention can also be employed to prevent excessive increases in the speed of the engine 152 due to decreases in the load applied to the engine. In such embodiments, similar steps of operation can be performed as those shown in FIG. 5; however, the values to which the ratios of the current sums to the previous sums are compared in steps 490 and 590 will be different from those shown, and typically be less than unity. Further, in such embodiments, the throttle commands issued to the engine 152 upon a determination of an excessive decrease in the load (corresponding to step 510) will result in at least a partial closing of the throttle, and the determinations made corresponding to steps 495 and 500 will relate to whether the engine speed is within a certain range above the nominal engine speed rather than below it.

The performing of the steps of the flowchart in FIG. 4 by the genset controller 100 can proceed according to any one of a number of different computer programs or routines. In one embodiment, the method steps of FIG. 5 are performed primarily by three of the subsystems shown in FIGS. 3 and 4, namely, the load disturbance detection subsystem 318, the metering subsystem 308, and the SAE J-1939 interface subsystem 360. Engine speed information, as well as voltage and current information concerning the alternator 154 that is based upon signals received at three-phase input interface 104, is provided from the metering subsystem 308 to the load disturbance detection subsystem 318 in response to requests from the load disturbance detection subsystem. Output signals to control the throttle 155 are provided by the SAE J-1939 interface subsystem 360 in response to commands from the load disturbance detection subsystem 318. In certain embodiments, various parameters such as instantaneous power are calculated using an additional subsystem, the real time math subsystem 358. The genset controller 100 typically performs the method steps by way of several public routines and several private routines. An exemplary computer program for performing one embodiment of the invention is attached hereto.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method of controlling a genset having an engine and an alternator in order to prevent an excessive change in a speed of the engine because of a sudden change in a load on the alternator, the method comprising:
    obtaining a first measured value of an actual AC output power of the alternator at a genset controller during a first time period;
    obtaining a second measured value of the actual AC output power of the alternator at the genset controller during a second time period;
    determining at the genset controller a first output power based upon at least the first measured value, and a second output power based upon at least the second measured value;
    determining at the genset controller, based upon the first output power and the second output power, whether the actual AC output power has changed in an amount greater than a first threshold; and
    providing a first control signal from the genset controller to the genset causing a position of a throttle to be modified when it is determined that the actual AC output power has changed in an amount greater than the first threshold.

2. The method of claim 1, wherein it is determined whether the actual AC output power has increased in an amount greater than the first threshold by comparing a ratio of the second output power to the first output power with a first threshold value, and the first control signal causes the throttle to be opened in response to the determination that the actual AC output power has increased in an amount greater than the first threshold.

3. The method of claim 2, further comprising:
    obtaining a measurement of the speed of the engine;
    determining whether a difference between the measurement and a nominal speed is less than a second threshold; and
    providing a second control signal from the genset controller to the genset causing control of the throttle to be released to an engine governor of the genset when it is determined that the difference is less than the second threshold.

4. The method of claim 3, wherein the second control signal causes the throttle to close.

5. The method of claim 3, wherein the second threshold is at least one of 25 RPM and a predefined value.

6. The method of claim 2, further comprising:
    obtaining a first plurality of additional values of the actual AC output power of the alternator at the genset controller during the first time period; and
    obtaining a second plurality of additional values of the actual AC output power of the alternator at the genset controller during the second time period,
    wherein the genset controller determines the first output power based upon the first measured value and the first plurality of additional values, and determines the second output power based upon the second measured value and the second plurality of additional values.

7. The method of claim 6, wherein the genset controller determines the first output power as the average of the first measured value and each of the first plurality of additional values, and determines the second output power as the average of the second measured value and each of the second plurality of additional values.

8. The method of claim 6, wherein the alternator is configured to operate at a frequency of 50 Hertz, and each of the first and second pluralities of additional values includes 18 additional values.

9. The method of claim 6, wherein the alternator is configured to operate at a frequency of 60 Hertz, and each of the first and second pluralities of additional values includes 15 additional values.

10. The method of claim 6, wherein the genset controller determines whether the actual AC output power has increased in an amount greater than the first threshold by calculating the ratio of the second output power to the first output power.

11. The method of claim 10, wherein the genset controller determines that the actual AC output power has increased in amount greater than the first threshold when the genset controller calculates that the ratio of the second output power to the first output power is greater than 1.3.

12. The method of claim 2, wherein the magnitude of the first control signal, and consequently the degree to which the throttle is caused to open, varies in dependence upon the degree to which the actual AC output power has increased.

13. The method of claim 2, further comprising:
    obtaining at least two measurements of the speed of the engine;
    calculating a slope of the speed of the engine;
    determining whether the slope exceeds a second threshold; and
    providing a second control signal from the genset controller to the genset causing the throttle to close when it is determined that the slope exceeds the second threshold.

14. The method of claim 3,
    wherein the providing of the first control signal continues after it is determined that the actual AC output power has increased in the amount greater than the first threshold, and
    wherein the magnitude of the first control signal that is provided varies in dependence upon the difference between the speed of the engine and the nominal speed until it is determined that the difference between the measurement and the nominal speed is less than the second threshold.

15. An apparatus for controlling a genset having an engine and an alternator in order to prevent an excessive change in a speed of the engine because of a sudden change in a load on the alternator, the apparatus comprising:

a first input terminal configured to receive at least a first measured value and a second measured value of an actual AC output power of an alternator of the genset;

a processor coupled to the first input terminal, wherein the processor is configured to determine a first output power and a second output power based upon at least the first measured value and at least the second measured value, respectively, and to determine, based upon the first output power and the second output power, whether the actual AC output power has changed in an amount greater than a first threshold; and a first output terminal coupled to the processor and configured to provide a first output signal to the genset causing a position of a throttle on the genset to be modified when the processor determines that the actual AC output power of the alternator has changed in an amount greater than the first threshold.

16. The apparatus of claim 15, further comprising:

a second input terminal coupled to the processor, the terminal being configured to receive a measurement of the speed of the engine, wherein the processor is configured to determine whether a difference between the measurement and a nominal speed is less than a second threshold, and wherein the first output terminal is configured to provide a second control signal from the genset controller to the genset causing control of the throttle to be released to an engine governor of the genset when it is determined that the difference is less than the second threshold.

17. The apparatus of claim 16, wherein the processor includes a microprocessor, wherein it is determined whether the actual AC output power has increased in an amount greater than the first threshold and, if the actual AC output power has been determined to have increased in an amount greater than the first threshold, the throttle is opened.

18. The apparatus of claim 16, wherein the first input terminal is a three-phase input interface, and the second input interface and the first output terminal are a CAN interface.

19. An apparatus for converting mechanical energy into electrical energy comprising:

a genset including an engine coupled to an alternator;

an engine control module coupled to the genset;

a means for monitoring an actual AC output power of the alternator, for determining whether the actual AC output power has increased in an amount greater than a first threshold, and for providing a first signal to the engine control module in order to cause an opening of a throttle of the engine when it is determined that the actual AC output power has increased in an amount greater than the first threshold; and a means for monitoring the speed of the engine, for determining whether a difference between the speed and a nominal speed is less than a second threshold, and for providing a second signal to the engine control module causing control of the throttle to be released to at least one of the engine control module and the engine when it is determined that the difference is less than the second threshold.

20. The apparatus of claim 19, wherein the means for determining whether the actual AC output power has increased in an amount greater than a first threshold determines an increase in the actual AC output power by comparing a first average of a first plurality of power measurements with a second average of a second plurality of power measurements.

* * * * *

UNITED STATES PATENT AND TRADEMARK OFFICE
CERTIFICATE OF CORRECTION

PATENT NO. : 6,555,929 B1
DATED : April 29, 2003
INVENTOR(S) : Eaton et al.

It is certified that error appears in the above-identified patent and that said Letters Patent is hereby corrected as shown below:

Column 9,
Line 22, "'step 410" should read -- step 410 --.

Signed and Sealed this

Twenty-third Day of September, 2003

JAMES E. ROGAN
*Director of the United States Patent and Trademark Office*